July 30, 1940.　　　O. R. SCHURIG　　　2,209,831
COFFEE MAKER
Filed July 31, 1937　　　2 Sheets-Sheet 2
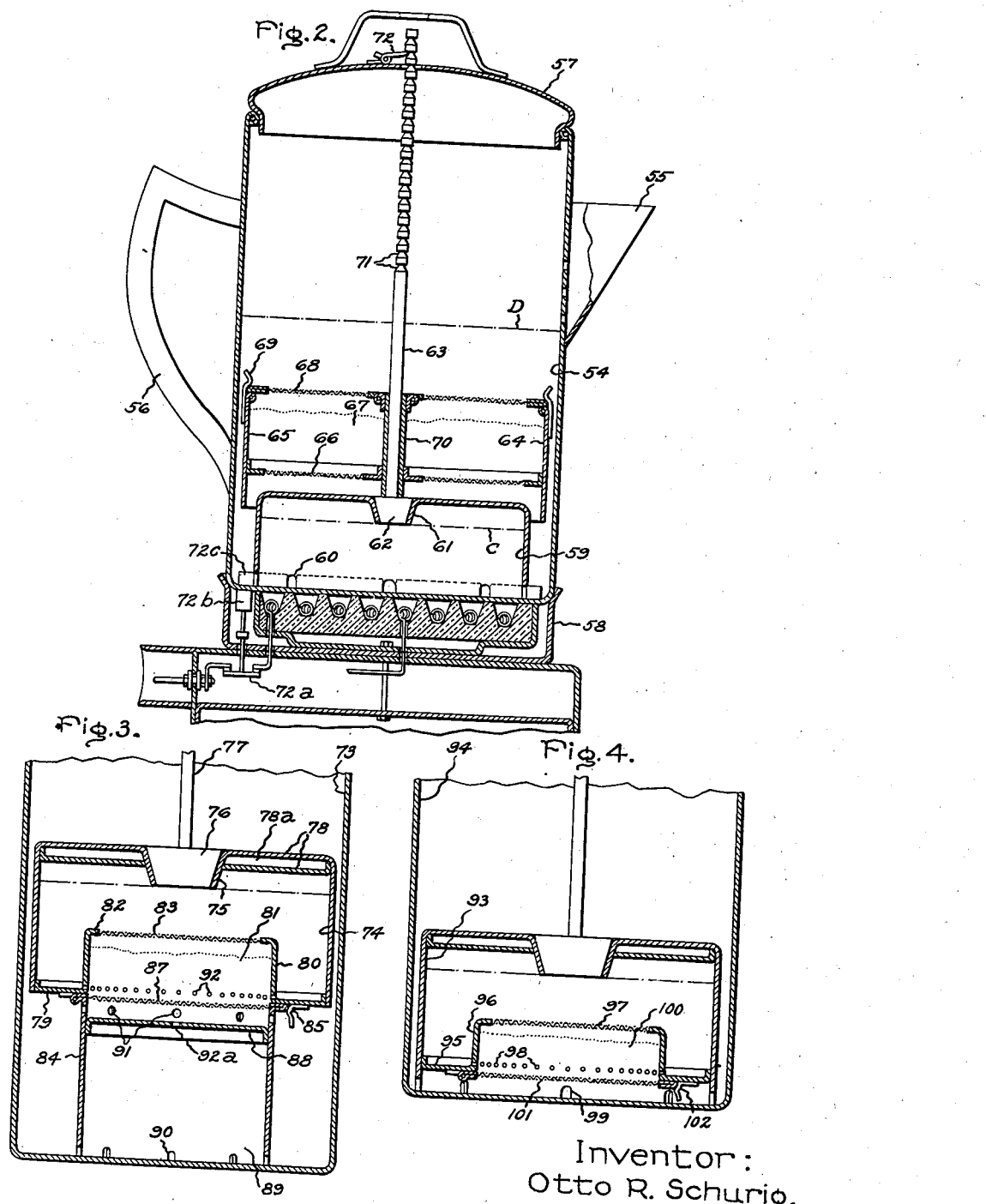
Inventor:
Otto R. Schurig,
by Harry E. Dunham
His Attorney.

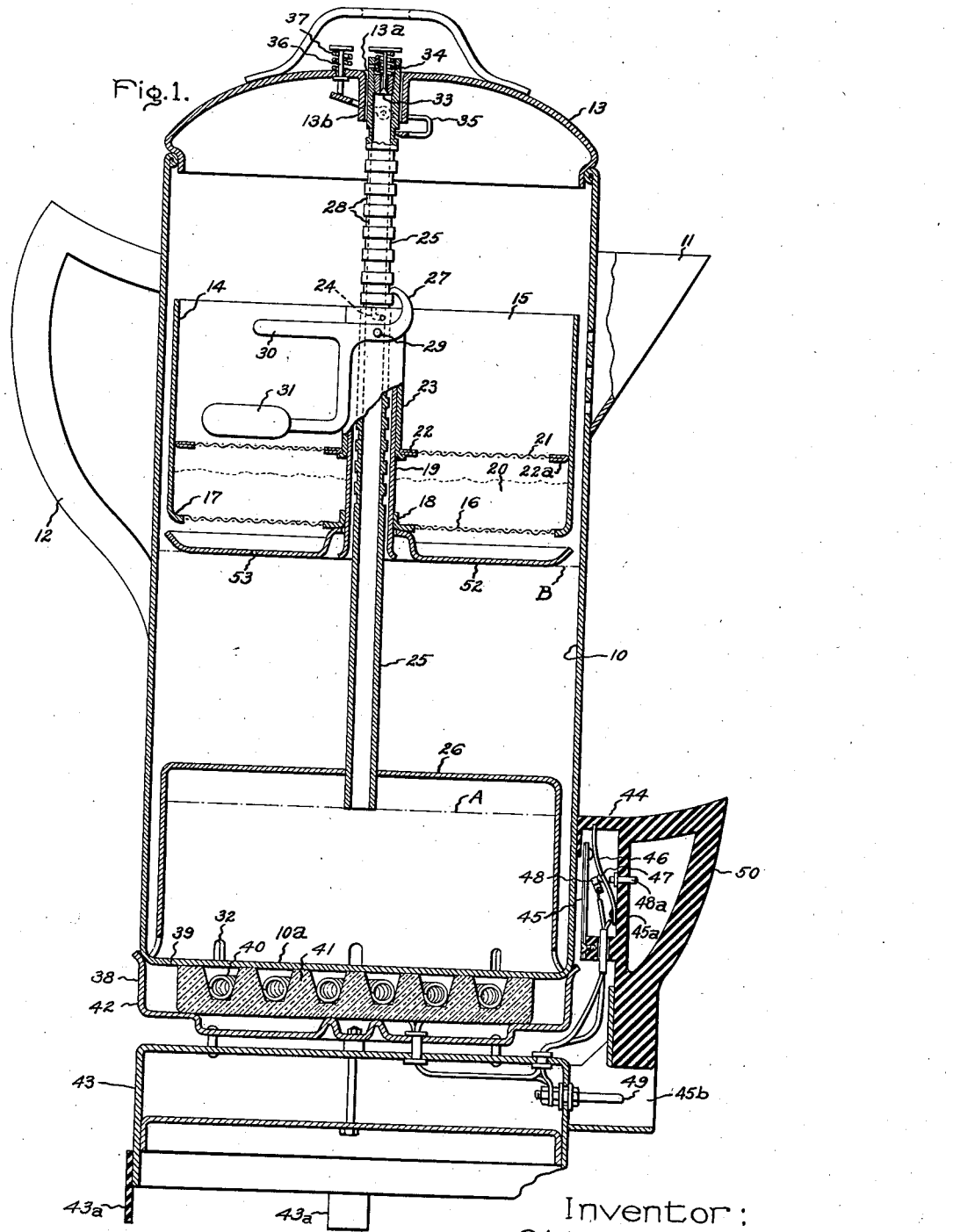

Patented July 30, 1940

2,209,831

UNITED STATES PATENT OFFICE 2,209,831

COFFEE MAKER

Otto R. Schurig, Schenectady, N. Y., assignor to General Electric Company, a corporation of New York Application July 31, 1937, Serial No. 156,736

11 Claims. (Cl. 53—3)

This invention relates to coffee makers, and it has for its object the provision of an improved device of this character.

This invention contemplates an improved coffee maker which heats the water to the proper temperature, and brings it into contact with the coffee grounds under such conditions that a very excellent coffee brew is obtained.

For a more complete understanding of this invention, reference should be had to the accompanying drawings in which Fig. 1 is a vertical sectional view of a coffee maker embodying this invention; Fig. 2 is a vertical sectional view illustrating a modified form of this invention; and Figs. 3 and 4 are fragmentary sectional views illustrating still two other modified forms of this invention.

Referring to Fig. 1, this invention has been shown in one form as applied to a coffee maker having a water infusing or steeping vessel 10. The vessel 10 is provided with a pouring spout 11 and with a handle 12. A suitable cover 13 is provided for the vessel.

Positioned within the steeping vessel 10 is a coffee basket or container 14. The container 14 as well as the vessel 10 preferably will have a cylindrical form, but this is not necessary as they may have any other suitable shape.

The coffee container 14 has an imperforate side wall 15 and is closed at the bottom by means of a screen 16. The screen 16 at its outer edge is secured to an inturned flange 17 provided on the side wall 15 and at its inner diameter is secured to a flange 18 which is mounted on a cylindrical central member 19. It will be understood that the coffee grounds 20 are supported upon the screen 16 at the bottom. Preferably, a screen cover 21 will be provided over the coffee grounds 20. This screen is supported by means of an inner central ring 22 which is secured to a cylindrical supporting member 23 that is positioned around the central tube 19. The member 23 is secured to the tube 19 in any suitable manner, as by means of a bayonet joint 24. The outer portion of the screen is reenforced by a ring 22a.

The coffee container 14 is supported upon a tubular-like rod 25 which at its bottom is secured to an inverted cup-shaped, bell-like member 26. As shown, the coffee container 14 is provided with a latching member 27 which is arranged to be latched in suitable recesses 28 spaced at intervals vertically of the rod 25. The latch is provided with a pin 29 pivotally supporting it on the tubular member 24 and with a weight 30 positioned to bias the latch in a counter-clockwise direction, as viewed in Fig. 1, that is, to bias it to its latching position. The latching member is provided with a float 31, the purpose for which will be described in greater detail hereinafter.

The bell 26, as shown, normally rests upon the bottom wall 10a of the infusion receptacle 10 and at the lower edges of its side wall is provided with a series of apertures 32 placing the bell in liquid communication with the infusion vessel. The interior of the bell is vented through the tube 25 which, as shown, is hollow and which connects with the interior of the bell at its lower end and with the exterior of the coffee maker at its upper end. This upper end is controlled by means of a valve 33 which is biased to its closed position by means of a compression spring 34, but which may be depressed manually to open the tube 25.

The upper end of the tube 25, as shown, extends through an aperture 13a provided for it in the center of the cover 13. Preferably, the cover at this section will be provided with a reentrant portion 13b extending downwardly in around the upper end of the rod, as shown. Pivotally mounted upon this reentrant portion 13b is a latching member 35 which is biased to its position shown in Fig. 1 wherein should the rod be elevated, the latch will engage one of the seats or depressions 28 to hold the rod in the elevated position. The latch is releasible by means of a manually depressible pin 36 which normally is biased to its retracted position of Fig. 1 by means of a spring 37.

The infusing vessel 10 is heated by means of an electrical hot plate 38 comprising a helical resistance conductor 39 wound in grooves 40 provided for it in an electrically insulating brick 41. The brick 41 is housed in a casing 42 which is supported on a base 43 that in turn is mounted on feet 43a. Mounted at one side of the unit is a temperature control device 44 which comprises a bimetallic thermostatic bar 45 mounted vertically within an electrically insulated housing 45a on the hot plate so that when the coffee maker 10 is placed upon the stove 38, the bimetallic bar 45 is placed relatively close to the side wall of the infusion receptacle opposite the bell 26 when in its position shown in Fig. 1. The housing 45a is supported out of direct thermal contact with the plate 41 by a bracket 45b. The bimetallic thermostat bar 45 controls a spring switch member 46 which carries a movable contact 47. The contact 47 cooperates with a fixed contact 48. The contact 48 as well as the spring 46 are electrically connected in the circuit of the resistance conductor 39. When the temperature of the bar 45 attains a predetermined high value, it moves toward the right, as viewed in Fig. 1, and snaps the switch arm contact 47 away from the fixed contact 48 to open the switch and thereby deenergize the heating element. The switch arm 46 may be closed when desired by means of a manually operable button 48a, which when depressed engages the arm to snap it to engage the contact 48.

The stove 38 is provided with twin terminal pins 49 to receive an ordinary supply plug of the usual twin conductor supply cord (not shown). The stove is further provided with a suitable handle 50 whereby it may be conveniently transported.

The electric hotplate 38 including the automatic temperature control device 44 is described and claimed in my copending application, Serial No. 236,046, filed October 20, 1938, which application is a division of this application.

In the operation of the coffee maker shown in Fig. 1 it will be understood that a suitable quantity of water will be placed in the infusion vessel 10 when the coffee container 14, the rod 25 and the bell 26 are removed. After the proper quantity of water has been placed within the vessel, the rod 25 and the bell 26 will be lowered into the liquid. The valve 33 will be opened so that the air in the bell can be released through the tube 25. Preferably, the tube 25 will enter the bell 26 for a short distance, as shown, so that the maximum liquid level in the bell will not rise above the line A, whereby a small quantity of air will be left above the liquid level.

The level of the liquid in the immersion vessel 10 will be considerably higher than that in the bell, the height depending upon the quantity of liquid placed in the vessel initially. For example, the level in the vessel 10 may be at the line B.

After the bell has been positioned in the vessel 10 the coffee container 14 with the coffee grounds 21 in it will be placed within the infusion vessel 10 upon the rod 25. It is preferable to place the coffee container so that its lower screen wall 16 is substantially at or slightly above the liquid level B. To assist in thus locating the container a float pan 52 is attached to the container below the bottom wall 16 spaced a short distance below the screen bottom 16. The pan is provided with a relatively few apertures 53 through its bottom wall. When the coffee container is placed within the vessel 10, the pan 52 will momentarily float the container on the liquid level B. When the vessel is thus momentarily floated, the latch will automatically move into the appropriated depression 28 to hold the container in this position.

Now if the heating element 38 be plugged into its supply source and the resistance conductor 39 energized, heat will be imparted to the liquid within the bell 26 through the bottom wall 10a of the infusion vessel. As the liquid in the bell 26 is heated, vapor pressure will be generated and will collect in the top of the bell above the liquid level A. Also the air within the space above this level will become heated. Eventually the pressure of the heated air and vapor pressure will be such that it will begin to force the water in the bell outwardly through the apertures 32 at the bottom of the bell into the infusion vessel 10. The liquid level B rises as more and more liquid is forced out of the bell, and eventually it will rise sufficiently high to immerse the coffee grounds 20 in the coffee container 14. When the level B rises to and above the level of the upper surface of the coffee grounds, it will elevate the float 31 to release the latching member to permit the coffee container 14 to drop down in the water in the vessel 10.

The bell 26 will attain buoyancy as more and more water is forced out of it and eventually it will move upwardly in the vessel 10 with its rod 25 to carry the coffee container 14 upwardly through the heated liquid to its upper level and finally will move it so high that the coffee grounds 20 will be moved out of the liquid whereupon the latch 30 will automatically hold the coffee container in the maximum elevated position to which it is raised by the bell. The latch 35 automatically engages in a seat 28 on the rod 25 to hold the rod, coffee container and bell in their elevated positions.

Thus, the coffee grounds have been initially immersed by the rising liquid level B, they have been released so that they drop down in the heated water, and finally, they have been elevated to a position out of the water and automatically latched in this position.

The parts are so arranged and proportioned that the coffee grounds will be immersed in water which has the desired temperature of approximately 200 to 205° F. and will be immersed in the water only from one to two minutes. Under these conditions, it has been found that a very excellent coffee brew is attained.

When the water has been substantially pumped out of the bell 26, the temperature at the thermostat 45 increases to such a high value that it functions to shut off the heat automatically. After the heat has thus been shut off, it is necessary to depress the button 48a to reclose the switch to reenergize the resistance element 40. To serve the coffee it is merely necessary to pour the coffee brew from the spout. If desired, the lid 13 with the coffee container 14 and bell 26 latched to it may be removed before pouring.

In Fig. 2, there is illustrated a modified form of this invention. In this case there is provided an infusion vessel 54 which like the vessel 10 is provided with a pouring spout 55, a handle 56 and a cover 57. The infusion vessel is heated by an electric stove 58 which in general is substantially of the same type and construction as the stove 38 of the first form. A bell 59 is provided having apertures 60 placing it in liquid communication with the infusion receptacle. The bell is provided with a central reentrant portion 61 which is normally closed by a plug or stopper 62 to which a rod 63 is attached directed upwardly in the infusion receptacle and through a centrally arranged aperture provided for it in the cover 57, as shown. The coffee container 64 in this case is provided with a cylindrical side wall 65 and with a bottom screen wall 66 for supporting the coffee grounds 67 in the container. The container is covered at the top by means of a screen 68 which is secured to the container by latch members 69. The container is provided with a centrally arranged tube 70 which is secured to the screens 66 at the center and which extends downwardly through it to engage the upper side of the stopper 62, as shown in Fig. 2 and thereby space the container from the bell.

The upper portion of the rod 63 is provided with a series of depressions or steps 71 with which a suitable latch 72 supported on the cover is adapted to cooperate to support the rod 63 in various elevated positions.

In the operation of this form of the invention thus far described, when it is desired to make coffee the desired amount of water will be placed in the infusion vessel 54. Then the bell 59 will be inserted in this vessel with the rod 63 removed so that the bell can vent itself through the central opening through the reentrant portion 61. Preferably, the reentrant portion 61 will be such that a liquid level C will be established in the bell spaced somewhat from the top as shown. After this the rod 63 will be inserted so that the stopper 62 is fitted in the seat 61. Then the coffee container 64 with the coffee grounds in it will be inserted in the infusion receptacle over the rod 63, the depending part of the inner tubular member 70 spacing the bottom wall 66 of the coffee container from the top of the bell, as shown.

In this case, it is contemplated that the coffee grounds will be immersed initially. In other words, the water level in the infusion vessel 54 will be at some line above the container, such as indicated by the letter D.

As in the first case, when the water in the bell is heated, it will eventually be forced from the bell, and eventually, the bell will attain sufficient buoyancy to rise in the container to carry the rod 63 and the coffee container 65 upwardly through the water in the coffee maker. As the rod 63 rises, the latch 72 successively engages lower steps 71 until eventually when the bell rises no longer, the latch will hold the rod 63, and the bell and coffee container in their elevated positions. This does not occur however until the bell has risen sufficiently to carry the coffee grounds 67 out of the liquid.

The hot plate is controlled by means operated responsively to the rise and fall of the bell 59. For this purpose, a switch 72a is inserted in the energizing circuit of the plate. A magnet 72b is attached to the switch and cooperates with an iron ring 72c around the lower edge of the bell, as shown. When the bell is in its lower positions, the magnet is attracted to the ring to hold the switch closed, but when the bell by moving up in the liquid separates the ring and magnet sufficiently far, the magnetic attraction of the magnet for the ring is not sufficiently great to hold the switch closed, the switch thereupon falling to its open position. The ring 72c is broken into segments lying between the openings 60—but a complete ring with openings registering with the openings 60 may be used. This hot plate control operated responsively to the rise and fall of the bell is described and claimed in my copending application Serial No. 207,071, filed December 1, 1939, which application is a division of this application.

In Fig. 3 there is illustrated still another form of this invention. In this case, there is provided an infusion receptacle or vessel 73 into which a bell 74 is inserted. The bell 74 is provided with a reentrant central portion 75 which receives a stopper 76. The stopper 76 supports a rod 77. The top of the bell is provided with a double wall 78 providing a dead air space 78a which serves as an insulating barrier between the liquid within the bell and the liquid in the vessel 73 above it.

The bell is provided with a bottom wall 79 which has a relatively large central reentrant portion 80. This reentrant portion serves to hold the coffee grounds 81. As shown, the upper edges of the reentrant portion are provided with inturned flanges 82 which support a screen top 83.

Hinged to the bottom wall 79 is a cylindrical member 84 which is provided with a latch 85 that holds the cylindrical member in the position shown in Fig. 3. At the upper end of this cylindrical member is a screen 87 which acts as a bottom wall or support for the coffee grounds 81. To insert the grounds the member 84 is moved to an open position.

Positioned below the screen 87 is a wall 88. The member 84 and wall 88 define a second bell 89 below the wall 88. This bell communicates with the infusion vessel 73 through openings 90. The space within the member 84 between the wall 88 and screen 87 communicates with the infusion vessel through openings 91. The side walls of the reentrant portion 80 and the bottom have a series of openings 92. A vent opening 92a is provided in the wall 88.

The infusion receptacle 73 may be provided with a suitable heat source under the bottom wall, such as an electric stove.

In the operation of this form of the invention, assuming that the proper quantity of water has been placed within the infusion vessel 73 and that the heat is applied to the bottom wall, the pressure that is generated due to the heating of the water in both bells 74 and 89 forces the water out of them and into the infusion vessel. That flowing from the former passes through the layer of coffee grounds 81. As the water is forced out the bells attain buoyancy and rise in the vessel 73. However, due to the heat barrier 78 the water in the vessel 73 has not been heated appreciably and as the bell rises, it acts through the side walls of the bell to condense the water vapor in the bell and likewise that in the bell 89. This reduces the pressure in the bell and water is drawn into it and the bell falls in the receptacle 73. The water that has been drawn in is then heated and the process is repeated, the bell rising and sinking several times before the water in the entire vessel 73 becomes sufficiently hot to prevent condensation of the water vapor in the bell when the bell rises. Usually this occurs when the water in the vessel 73 has been heated substantially uniformly throughout. When this condition is attained the bell will rise and will not fall again. The lower bell 89 is provided to give added buoyancy to insure that the coffee grounds 81 will be elevated above the upper brew level in the infusion receptacle.

It will be observed that as each charge of water is forced out of the bell and drawn into it that it is caused to course through the coffee grounds.

The form shown in Fig. 4 is substantially the same as that shown in Fig. 3 except that the lower bell has been eliminated. In this case, the bell 93 is placed in an infusion vessel 94. Here the bell is provided with a bottom wall 95 which is provided with a reentrant portion 96 supporting a screen 97 at the top, and at the bottom having a series of apertures 98. The bottom wall 95 in this case is spaced somewhat above the lower edge of the bell, as shown. The bell in the side walls below the bottom wall 95 is provided with a series of apertures 99 placing it in communication with the infusion vessel 94. The coffee compartment for the coffee grounds 100 is completed by a screen member 101 hinged to the bottom and provided with a latch 102. The operation of this form is the same as described in connection with Fig. 3, except that in this case, it is possible that the coffee grounds 100 may not be elevated above the maximum liquid level in the container 94, because the lower bell 89 of Fig. 3 has not been used.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A device for making coffee and the like comprising a vessel for receiving an infusing liquid, a container in the vessel for receiving the coffee, a bell in said receptacle below said coffee container having means supporting the container above it, the liquid under said bell when heated being forced out from the bell by the generation of pressure in the bell to raise the liquid level in the vessel and thereby immerse the coffee grounds in said container, and the bell then gaining buoyancy as the liquid is forced out so as to rise and move the container upwardly in said receptacle above the liquid level and means for heating the liquid in said bell.

2. A coffee maker and the like comprising an infusion receptacle, a coffee container within said receptacle, a bell in the bottom of said receptacle supporting said container, the liquid under the bell being forced out from the bell and into contact with said coffee container when the pressure generated under the bell by the heating of the liquid in it attains a predetermined magnitude, the bell eventually rising due to its buoyancy as the liquid is forced out to carry the coffee container up through and out of contact with said liquid, and locking means operating automatically in response to the movement of said coffee container by said bell to a predetermined elevated position to lock said coffee container in said elevated position.

3. A coffee maker comprising an infusion receptacle, a bell within said receptacle resting on its bottom wall and having openings in its walls adjacent the bottom thereof connecting the interior of the bell with the infusion receptacle, a rod-like member extending upwardly in said receptacle from said bell, a coffee container mounted on said rod-like member, means for applying heat to said bottom wall to heat the liquid in said container, the liquid under the bell being forced outwardly therefrom by the generation of pressure under it when the liquid is heated and the bell when substantially all of said liquid has been forced out floating upwardly to elevate said rod-like member and the coffee container to carry the latter out of said liquid, and latching means operating to hold said coffee container in its elevated position.

4. A coffee maker comprising an infusion receptacle having a cover at the top, a bell within said receptacle resting on its bottom wall and having openings in its walls adjacent the bottom thereof, a rod-like member extending upwardly in said receptacle from said bell-shaped member and through the cover of said receptacle, a coffee container mounted on said rod-like member, means for applying heat to the bottom wall to heat the liquid in said container, the liquid under the bell being forced outwardly therefrom by the generation of vapor pressure under it when the liquid is heated and the bell when substantially all of said liquid has been forced out floating upwardly to elevate said rod-like member and the coffee container to carry the latter out of said liquid, and a latch carried by said cover arranged to engage said rod to hold it and the coffee container in their elevated positions.

5. A device for making coffee and the like comprising an infusion receptacle, a support within said receptacle, a container for the coffee movably mounted on said support, means for locking said container on said support in selected positions, a confined chamber in liquid communication with said infusion receptacle, means for heating the liquid in said confined chamber to drive it out by the generation of vapor pressure in said chamber and into said infusion receptacle to elevate the liquid level therein, and means for releasing said coffee container responsively to the rise in liquid level.

6. A device for making coffee and the like comprising an infusion receptacle, a support within said receptacle, a container for the coffee movably mounted on said support, means for locking said container on said support in selected positions, a bell in the bottom of said infusion receptacle having an opening in its wall placing the bell in liquid communication with said receptacle, means for heating the liquid in said bell to drive it out by vapor pressure into said receptacle to elevate the liquid level therein, and means operated by the rising liquid level to release said coffee container and thereby permit it to drop down into said liquid, the bell eventually floating up when substantially all of the liquid under it has been forced out to engage the coffee container and elevate it above the level of said liquid.

7. A device for making coffee and the like comprising an infusion receptacle, a support within said receptacle, a container for the coffee movably mounted on said support, means for locking said container on said support in selected positions, a bell in the bottom of said infusion receptacle having an opening in its wall placing the bell in liquid communication with said receptacle, means for heating the liquid in said bell to drive it out by vapor pressure into said receptacle to elevate the liquid level therein, and means operated by the rising liquid level to release said coffee container and thereby permit it to drop down into said liquid, the bell eventually floating up when substantially all of the liquid under it has been forced out to engage the coffee container, and elevate it, and means for latching said container to hold it in its elevated position.

8. A coffee maker comprising an infusion receptacle, a bell in the bottom of said receptacle constructed and arranged so that the liquid in the bell is forced out into said receptacle by vapor pressure generated in the bell when the liquid in the bell is heated, the bell thereby gaining buoyancy and rising in said receptacle, a vertically positioned support on said bell, a coffee container mounted on said support for vertical movement with reference to the support, means for securing said support in each of a plurality of vertical positions, means for releasing said bell in response to the rise of the liquid level in said container due to the admission of liquid to the container from said bell, and means for holding said bell in an elevated position when it buoys up as the liquid in the bell is forced out.

9. An infusion device for making coffee and the like comprising an infusion receptacle, a bell in said receptacle resting on its bottom wall and in liquid communication with said receptacle, a rod-like support extending upwardly from said bell, a coffee container mounted on said rod for vertical movement on it, a plate below said container arranged when the container is placed on the rod to float the container momentarily on the surface of the liquid in the container, means for latching the container to the support at the level of said surface and means for heating the water in the bell to drive it out by the generation of vapor pressure under the bell and thereby give the bell buoyancy to rise in the receptacle and elevate said coffee container.

10. A device for making coffee and the like comprising an infusion receptacle, a support within said receptacle, a container for the coffee movably mounted on said support, means releasably holding said container on said support in an elevated position, a confined chamber in liquid communication with said receptacle, means for heating the liquid in said confined chamber to drive it out by the generation of vapor pressure in said chamber and into said infusion receptacle to elevate the liquid level therein, and means automatically releasing said coffee container responsively to the rise in liquid level in said receptacle.

11. A device for making coffee and the like comprising an infusion receptacle, a support within said receptacle, a container for the coffee movably mounted on said support, means for holding said container on said support in selected positions, a bell in the bottom of said infusion receptacle, means for heating the liquid in said bell to drive it out by vapor pressure into said receptacle to elevate the liquid level therein, means operated by the rising liquid level to release said coffee container and thereby permit it to drop down into said liquid, the bell eventually floating up when substantially all of the liquid under it has been forced out to engage the coffee container and elevate it, and means for holding said container in its elevated position.

OTTO R. SCHURIG.